United States Patent [19]

Ichikawa et al.

[11] Patent Number: 4,789,652
[45] Date of Patent: Dec. 6, 1988

[54] BASIC REFRACTORY COMPOSITION

[75] Inventors: Kenji Ichikawa; Hiroyuki Sugimoto; Ryosuke Nakamura; Akihiro Morita, all of Bizen, Japan

[73] Assignee: Shinagawa Refractories Co., Ltd., Tokyo, Japan

[21] Appl. No.: 928,281

[22] PCT Filed: Mar. 10, 1986

[86] PCT No.: PCT/JP86/00123

§ 371 Date: Oct. 20, 1986

§ 102(e) Date: Oct. 20, 1986

[87] PCT Pub. No.: WO87/05288

PCT Pub. Date: Sep. 11, 1987

[51] Int. Cl.$^4$ .............................................. C04B 35/02
[52] U.S. Cl. ..................... 501/127; 501/94; 501/122; 501/133; 501/146
[58] Field of Search .................. 106/84; 501/94, 122, 501/127, 133, 146

[56] References Cited

U.S. PATENT DOCUMENTS 2,568,237  9/1951  Lathe .................... 501/127
3,656,977  4/1972  Dreyling et al. .......... 501/94

FOREIGN PATENT DOCUMENTS 53-110613  9/1978  Japan.
56-114873  9/1981  Japan.
58-34423   7/1983  Japan.
596341     1/1948  United Kingdom .......... 106/84

*Primary Examiner*—Steven Capella
*Attorney, Agent, or Firm*—Oblon, Fisher, Spivak, McClelland & Maier

[57] ABSTRACT

The present invention resides in the provision of a basic unburned brick or castable refractory which contains none or an extremely small amount of components which exert a harmful influence on molten steel such as phosphorus, sulfur, and boron and which has a high hot strength.

2 Claims, 1 Drawing Sheet

BASIC REFRACTORY COMPOSITION

TECHNICAL FIELD

This invention relates to a basic refractory such as unburned bricks, gunning materials, trowelling materials, and castable materials for steel-making containers such as electric furnaces, converters, ladles, and tundishes.

TECHNICAL BACKGROUND

Various types of chemical binders are used in basic unburned bricks and various types of basic castable refractories. Namely, well-known chemical binders such as organic binders such as tar, pitch, and phenol resins, and magnesium sulfate, alkali phosphates, alkali earth metal phosphates, alkali silicates, alkali borates, alumina cement, and the like are used. These chemical binders play a very important roll, increasing the binding power of the refractory, making the refractory easy to apply, and the like.

However, there are various problems with refractories employing the above-described chemical binders. Namely, when refractories employing organic chemical binders such as phenol resins, tar, pitch, and the like are used in an oxidizing atmosphere, combustion of carbon takes place, the texture deteriorates, and there is the drawback that adequate durability can not be obtained. Furthermore, with refractories using magnesium sulfate, various types of phosphates, and alkali borates, there is the fear of molten steel being contaminated by the phosphorus, sulfur, boron, and the like contained in the chemical binder. In addition, the hot strength of a basic refractory employing alumina cement or alkali silicate is low, the damage from wear by molten steel and the like is large, and the fire resistance is inadequate.

DISCLOSURE OF THE INVENTION

This invention was made in order to solve the above-described problems, and its object resides in the provision of a basic unburned brick or castable refractory which contains none or only an extremely small amount of components such as phosphorus, sulfur, and boron which exert a harmful influence on molten steel and which has a high hot strength.

The object of the present invention resides in the provision of a basic refractory composition characterized by containing 100 parts by weight of one or two or more basic aggregates selected from the group consisting of magnesia clinker, dolomite clinker, lime clinker, limestone, dolomite stone, calcium hydroxide, and brick scraps, and 0.1-30 parts by weight as of modified sodium silicate made from acidic china clay calculated as a powder, or 0.1-30 parts by weight as of said modified sodium silicate calculated as a powder and 0.01-10 parts by weight as of a curing agent for said modified sodium silicate, the resulting basic refractory containing at least 1% CaO, and $$\frac{\text{CaO content (weight \%) of basic refractory composition}}{\text{SiO}_2 \text{ content (weight \%) of basic refractory composition}} \geq 1.5$$

By utilizing various types of basic aggregates together with modified sodium silicate made from acidic china clay, the present inventors were able to obtain a basic refractory containing no components which are harmful to steel and having a high hot strength.

The present invention can be used in basic unburned bricks and castable refractories such as stamping materials, gunning materials, trowelling materials, and castable materials, and it is a basic refractory composition to which can be admixed a plasticizer or a curing agent for modified sodium silicate, or both, depending on which of the above-mentioned applications it is used for.

The present inventors discovered that as a result of the above-mentioned admixture, a high hot strength which can not be obtained with a conventional sodium silicate-containing refractory and which is equal to that of a phosphate bond-containing refractory can be achieved.

In particular, among the above-mentioned basic aggregates, those aggregates containing CaO react with modified sodium silicate, and as a result a high hot strength is obtained. It is thought that the reason for this is that the CaO content of the basic aggregate reacts with the $SiO_2$ in the modified sodium silicate, and at high temperatures the compounds $2CaO \cdot SiO_2$ or $3CaO \cdot SiO_2$ are formed. It is thought that conventional sodium silicate produces the same sort of reaction, but even if the same composition is employed, only 1/5–1/10 of the strength of the present invention can be obtained.

The modified sodium silicate made from acidic china clay which is used in the present invention is MIZUKANEX-100 (liquid) and MIZUKANEX-150 (powder), manufactured by Mizusawa Industrial Chemicals, Ltd. According to the catalog for MIZUKANEX, the characteristics of this modified sodium silicate are as explained below:

"The special characteristics of MIZUKANEX reside in its matrix being special silica having a laminar structure which is removed from acidic china clay by a special technique.

The special silica having this laminar structure (see FIG. 1) has the properties of an inorganic polymer and has the following characteristics.
(1) It comprises ultrafine particles (at most 0.1 microns)
(2) The surface area is extremely large.
(3) It is highly active.
(4) It is non-crystalline.
(5) It possesses a hydroxyl group.

Because MIZUKANEX has a matrix which is an inorganic polymer of silica having this type of laminar structure, when it is used as a binder, it has excellent binding power and heat resistance, good affinity for water, and excellent performance with respect to water-resistance and the like, making it an inorganic binder of high general utility."

The quality of MIZUKANEX-100 and MIZUKANEX-150 is shown in Table 1.

TABLE 1

| | PROPERTIES OF MIZUKANEX | |
|---|---|---|
| Name | MIZUKANEX-100 | MIZUKANEX-150 |
| Abbreviation | M/100 | M/150 |
| Main Component | Modified sodium silicate | Modified sodium silicate |
| Physical Properties | | |
| Hue | Colorless, clear | White |
| Form | Liquid | Powder |
| Particle diameter (microns) | | 20–120 |
| Bulk specific gravity | 1.42–1.48 (liquid, 20° C.) | 0.62–0.78 |

TABLE 1-continued

| | PROPERTIES OF MIZUKANEX | |
|---|---|---|
| Name | MIZUKANEX-100 | MIZUKANEX-150 |
| (g/ml) | | |
| pH | 11.9–13.5 | 11.9–13.5 (50% solution) |
| Chemical Composition | | |
| SiO$_2$ (%) | 25–26 | 44–47 |
| Na$_2$O (%) | 12–13 | 26–28 |

MIZUKANEX-100 and MIZUKANEX-150 are modified sodium silicates having the above characteristics.

Hereinbelow, the present invention will be described in detail.

The basic aggregate which can be employed in the present invention is an aggregate comprising magnesia clinker, dolomite clinker, lime clinker, scraps of MgO-CaO type bricks, and the like, and raw aggregates such as limestone, dolomite stone, and calcium hydroxide.

In order to obtain the high hot strength which characterizes the present invention, it is necessary for the refractory composition to contain at least 1% of CaO. If the CaO content is less than 1%, a high hot strength can not be obtained. The CaO content and the type of aggregate can be varied in accordance with the use. Namely, when corrosion resistance is important, the magnesia content can be increased, the CaO content can be increased when it is desired to increase the resistance to structural spalling, and a raw material such as limestone or dolomite stone can be used to increase the thermal insulating properties or the fluxing.

The amount of modified sodium silicate which is admixed is preferably 0.1–30 parts by weight calculated as a powder per 100 parts by weight of the above-described basic aggregate. If the amount which is admixed is less than 0.1, the binding power is inadequate and the strength decreases, which is not desirable. On the other hand, if it exceeds 30 parts by weight, the corrosion resistance and the hot strength of the basic refractory composition decrease, which is not desirable.

Furthermore, the amount of modified sodium silicate which is admixed is also determined by its ratio to the amount of CaO in the basic refractory according to the present invention. Namely, by adjusting the composition and admixing such that the following ratio is satisfied, a high hot strength can be obtained.

$$\frac{\text{CaO content (weight \%) of basic refractory composition}}{\text{SiO}_2 \text{ content (weight \%) of basic refractory composition}} \geq 1.5$$

In addition to the above substances which form the basis of the refractory, depending on the use, a plasticizer or a curing agent or both can be admixed. Namely, in order to improve the smoothness and the shape retention of a trowelling material, a plasticizer is added. On the other hand, a curing agent for the modified sodium silicate is admixed in order to cure a castable material after casting. Furthermore, a plasticizer is added in order to improve the adhesion ratio of a gunning material, while a curing agent is admixed in order to impart shape retention when it is desired to spray a thick coating. The amount of these additives which is admixed is preferably within a range which does not decrease the above-mentioned hot strength.

The amount of a plasticizer which is added is preferably 0.05–5 parts by weight. If the amount is less than 0.05 parts by weight, adequate shape retention and smoothness can not be obtained, and if it exceeds 5 parts by weight, the decrease in hot strength and corrosion resistance are remarkable, which is undesirable. Various types of clays such as bentonite, ball clay, levigated clay, and sepiolite, and organic pastes such as methyl cellulose and polyvinyl alcohol can be used as the plasticizer.

Various phosphates such as sodium hexametaphosphate, calcium phosphate, and silicon phosphate, curing agents made from inorganic salts such as sodium silicofluoride, sodium bicarbonate, and sodium aluminate, and organic substances such as polyglyoxal and acetic acid can be used as the curing agent. The amount of curing agent which is added is preferably 0.01–10 parts by weight. If less than 0.01 parts by weight are added, the gelation of the modified sodium silicate is inadequate and the strength is insufficient. If the amount exceeds 10 parts by weight, the speed of gelation is too swift, making application difficult, and the corrosion resistance deteriorates, which is not desirable.

THE PREFERRED EMBODIMENT OF THE INVENTION

Figure 1:
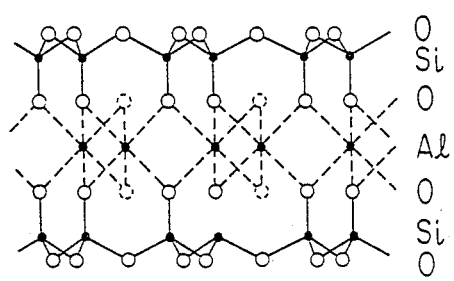
FIG. 1 is an illustration of the laminar structure of acidic china clay.

Hereinbelow, the present invention will be further explained by means of examples.

EXAMPLE 1

The basic refractory compositions having the compositions shown in Table 2 were molded under a molding pressure of 1.5 tons per square centimeter, and un-burned basic bricks (Products I and II of the present invention and Conventional Products I and II) were obtained. The hot bending strengths at 1400 degrees C. of the resulting unburned basic bricks are also shown in Table 2.

TABLE 2

| | Product of Invention | | Conventional Product | |
|---|---|---|---|---|
| | I | II | I | II |
| Composition (Parts by Weight) | | | | |
| Seawater magnesia clinker 3–0.5 mm | 60 | 60 | 60 | 60 |
| Seawater magnesia clinker −0.5 mm | 20 | 37 | 40 | 40 |
| Limestone −0.5 mm | 20 | 5 | | |
| Calcium hydroxide −0.3 mm | | 2 | | |
| **MIZUKANEX-100 (liquid product) | *4 | *5 | | |
| Sodium silicate No. 3 | | | *10 | *5 |
| Levigated clay | | | | *2 |
| Sodium hexametaphosphate | | *0.5 | | |
| CaO/SiO$_2$ in composition | 6.7 | 2.2 | 0.3 | 0.3 |
| Molding pressure (tons/cm$^2$) | 1.5 | 1.5 | 1.5 | 1.5 |
| Hot bending strength at 1400° C. (kg/cm$^2$) | 60 | 50 | 10 | 5 |
| Linear change after heating (%) (1500° C. 2 hours) | −0.5 | −0.4 | −1.5 | −2.0 |

*indicates outer percentage
**MIZUKANEX-100 is a tradename for modified sodium silicate In the above Table 2, the hot bending strengths at 1400 degrees C. of Products I and II of the present invention to which modified sodium silicate (MIZUKANEX 100) was added were 60 kg/square cm and 50 kg/square cm, respectively. In contrast, the hot bending strengths of Conventional Products I and II to which was added liquid sodium silicate No. 3 were 10 kg/square cm and 5 kg/square cm, respectively, showing that the hot bending strength at 1400 degrees C. was greatly improved.

EXAMPLE 2

The basic refractory compositions having the compositions shown in the following Table 3 were sprayed onto a panel at 1100 degrees C. as a gunning material for hot repairs. The characteristics of the resulting gunning material are also shown in Table 3.

TABLE 3

|  | Product of Invention | | | Conventional Product | |
|---|---|---|---|---|---|
|  | III | IV | V | III | IV |
| Composition (Parts by weight) | | | | | |
| Seawater magnesia clinker 3–0.5 mm | 10 | 10 | | 10 | 10 |
| Synthetic dolomite clinker 3–0.5 mm | 60 | | | 60 | |
| Natural dolomite clinker 3–0.5 mm | | 50 | | 50 | |
| Seawater magnesia clinker −0.5 mm | 29 | 35 | | 35 | 27 |
| Limestone 3–0.5 mm | | | 60 | | |
| Limestone −0.5 mm | | | 35 | | |
| Calcium hydroxide | 1 | 5 | 5 | 5 | 3 |
| MIZUKANEX-150 | *5 | *7 | *4 | | |
| Sodium silicate No. 3 (powder) | | | | *5 | |
| Sodium hexametaphosphate | *1 | | *0.5 | | *5 |
| Ball clay | *0.5 | | *20 | *0.5 | |
| Sodium bicarbonate | | *1 | | *1 | |
| CaO/SiO₂ in composition | 4.3 | 8.4 | 19.8 | 11.2 | 18.0 |
| Hot bending strength at 1400° C. (kg/cm²) | 20 | 25 | 23 | 2 | 20 |
| Adhesion ratio to panel at 1100° C. (%) | 90 | 85 | 90 | 85 | 80 |

*indicates outer percentage

In the above Table 3, the hot bending strengths at 1400 degrees C. of Products III–V of the present invention were the same as or better than that of a phosphate bond gunning material (Conventional Product IV). Furthermore, the adhesion ratio on a panel at 1100 degrees C. was superior to that of the phosphate bond gunning material. Also, the hot bending strength was far superior to that of a gunning material (Conventional Product III) to which sodium silicate No. 3 powder was added.

A phosphate bond gunning material (Conventional Product IV) contains a large amount of phosphorus atoms and is therefore not desirable from the standpoint of steel manufacture. In contrast, a gunning material made from a basic refractory composition according to the present invention contains none or only a very small amount of phosphorus atoms. This is a great advantage in steel manufacture.

EXAMPLE 3

The basic refractory compositions having the compositions shown in the following Table 4 were used as a TD trowelling material and as mortar. The results are shown in Table 4.

TABLE 4

|  | Product Name | | | | |
|---|---|---|---|---|---|
|  | Product of Invention | | | Conventional Product | |
|  | | | | TC | |
|  | TD Trowel Material | | Mortar | Trowel Mater. | Mortar |
| Item | VI | VII | VIII | V | VI |
| Composition (Parts by weight) | | | | | |
| Seawater magnesia clinker 3–0.5 mm | 50 | 45 | | 50 | |
| Seawater magnesia clinker −0.5 mm | 40 | 35 | 80 | 50 | |
| Limestone 3–0.5 mm | | 5 | | | |
| Limestone −0.5 mm | 10 | 15 | 20 | | |
| MIZUKANEX-100 | | | *35 | | |
| MIZUKANEX-150 | *5 | *10 | | | |
| Sodium silicate No. 3 (powder) | | | | *4 | |
| Sodium silicate No. 3 (liquid) | | | | | .35 |
| Sodium hexametaphosphate | | | *0.1 | | *0.1 |
| Levigated clay | *0.5 | *1 | | *2 | |
| CaO/SiO₂ in composition | 1.9 | 2.0 | 1.53 | 0.3 | 0.1 |
| Detachability from trowel | Good | Good | Good | Good | Good |
| Bonding strength at 1400° C. (kg/cm²) | 22 | 30 | 15 | 2 | 1 |

*indicates outer percentage

A TD trowelling material (Products VI and VII of the present invention) and a mortar (Product VIII of the present invention) made from a basic refractory composition according to the present invention could be easily applied, and their bonding strengths at 1400 degrees C. were far superior to those of Conventional Product V (a TD trowelling material) and Conventional Product VI (a mortar).

A basic refractory composition according to the present invention contains none or very little of components which are harmful to steel manufacture and the like such as phosphorus, sulfur, and boron which originate in chemical binders for refractories. Therefore, it is extremely excellent in that there is almost no comtamination of steel due to the above-mentioned harmful components, and in that depending on the use, the hot strength is the same as or better than that of a conventional product.

We claim:

1. A basic refractory composition comprising 100 parts by weight of at least one basic aggregate selected from the group consisting of magnesia clinker, dolomite clinker, lime clinker, limestone, dolomite stone, calcium hydroxide, and brick scraps, and 0.1–30 parts by weight of modified sodium silicate made from acidic china clay calculated as a powder, or 0.1–30 parts by weight of said modified sodium silicate calculated as a powder and 0.01–10 parts by weight of a curing agent for said modified sodium silicate, the resulting basic refractory containing at least 1% CaO, and $$\frac{\text{CaO content of basic refractory composition (weight \%)}}{\text{SiO}_2 \text{ content of basic refractory composition (weight \%)}} \geq 1.5$$

2. A basic refractory composition as claimed in claim 1, containing 0.05–5 parts by weight of a plasticizer.

* * * * *